(12) United States Patent
Yoon et al.

(10) Patent No.: US 10,775,782 B2
(45) Date of Patent: Sep. 15, 2020

(54) REMOTE PARKING CONTROL APPARATUS, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Dae Joong Yoon, Hwaseong-Si (KR); Jin Ho Park, Hwaseong-si (KR); Yun Sik Kim, Hwaseong-si (KR); Gil Won Seo, Hwaseong-si (KR); Ki Ho Lee, Yongin-si (KR); Sang Kyung Seo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 281 days.

(21) Appl. No.: 15/961,471

(22) Filed: Apr. 24, 2018

(65) Prior Publication Data

US 2019/0204821 A1     Jul. 4, 2019

(30) Foreign Application Priority Data

Jan. 3, 2018   (KR) ......................... 10-2018-0000761

(51) Int. Cl.
*G05D 1/00* (2006.01)
*G05D 1/02* (2020.01)
(Continued)

(52) U.S. Cl.
CPC ........... *G05D 1/0016* (2013.01); *B60W 30/06* (2013.01); *B62D 1/00* (2013.01); *B62D 15/027* (2013.01); *B62D 15/0285* (2013.01); *G05D 1/005* (2013.01); *G05D 1/0038* (2013.01); *G05D 1/0223* (2013.01); *G05D 1/0238* (2013.01); *B60W 2554/00* (2020.02); (Continued)

(58) Field of Classification Search
CPC .................................................. G05D 1/0016
See application file for complete search history.

(56) References Cited

U.S. PATENT DOCUMENTS 9,522,675 B1 *  12/2016  You ..................... B62D 15/0285
9,800,717 B2 *  10/2017  Ma ....................... H04M 1/72577
(Continued)

FOREIGN PATENT DOCUMENTS

JP       2017-0007399 A     1/2017
KR       10-1454406 B1     11/2014
(Continued)

*Primary Examiner* — Alex C Dunn
(74) *Attorney, Agent, or Firm* — Morgan, Lewis & Bockius LLP

(57) ABSTRACT

The present disclosure relates to a remote parking control apparatus, a system including the same, and a method thereof. The remote parking control apparatus includes a communication device configured to perform wireless communication with a parking assistant system in a vehicle, a controller configured to constitute one or more available remote control mode selection screen, and if one of the one or more available remote control mode is selected, constitute a control mode screen, and a display configured to display the one or more available remote control mode selection screen and the control mode screen.

18 Claims, 28 Drawing Sheets

(51) Int. Cl.
  *B60W 30/06* (2006.01)
  *B62D 15/02* (2006.01)
  *B62D 1/00* (2006.01)
(52) U.S. Cl.
  CPC ..... *B60W 2556/45* (2020.02); *B60W 2720/10* (2013.01); *B62W 2720/24* (2013.01); *G05D 2201/0213* (2013.01)

(56) References Cited

U.S. PATENT DOCUMENTS

| | | | | |
|---|---|---|---|---|
| 2002/0132702 | A1* | 9/2002 | Muramoto | B60T 7/12 |
| | | | | 477/183 |
| 2002/0198634 | A1* | 12/2002 | Shimazaki | B62D 15/028 |
| | | | | 701/1 |
| 2006/0235590 | A1* | 10/2006 | Bolourchi | B62D 7/159 |
| | | | | 701/41 |
| 2012/0184298 | A1 | 7/2012 | Moons et al. | |
| 2013/0060421 | A1* | 3/2013 | Kadowaki | B62D 15/027 |
| | | | | 701/36 |
| 2016/0304087 | A1 | 10/2016 | Noh | |
| 2017/0038775 | A1* | 2/2017 | Park | F02D 41/0007 |
| 2017/0090480 | A1* | 3/2017 | Ho | G05D 1/0214 |
| 2017/0222612 | A1* | 8/2017 | Zollner | G08G 1/167 |
| 2017/0232889 | A1* | 8/2017 | Miura | B60W 50/16 |
| | | | | 340/441 |
| 2018/0056937 | A1* | 3/2018 | Pflug | B60R 25/2036 |
| 2018/0141543 | A1* | 5/2018 | Krosschell | B60W 30/02 |
| 2018/0321676 | A1* | 11/2018 | Matuszeski | G05D 1/0055 |
| 2018/0339654 | A1* | 11/2018 | Kim | B60Q 9/002 |
| 2018/0370364 | A1* | 12/2018 | Vassily | B60K 35/00 |
| 2019/0054927 | A1* | 2/2019 | Hayakawa | B62D 15/0285 |
| 2019/0129412 | A1* | 5/2019 | Kim | G05D 1/0016 |

FOREIGN PATENT DOCUMENTS

| | | |
|---|---|---|
| KR | 10-2016-0123119 A | 10/2016 |
| KR | 10-2017-0025206 A | 3/2017 |

* cited by examiner (FRONT SIDE BLOCKING & LEFT/RIGHT SIDE BLOCKING:
REMOTE REARWARD MOVEMENT COMING-OUT,
REMOTE FORWARD/REARWARD MOVEMENT)

(LEFT/RIGHT SIDE BLOCKING & FRONT/REAR SIDE OPENING:
REMOTE FORWARD/REARWARD MOVEMENT,
REMOTE REARWARD MOVEMENT COMING-OUT)

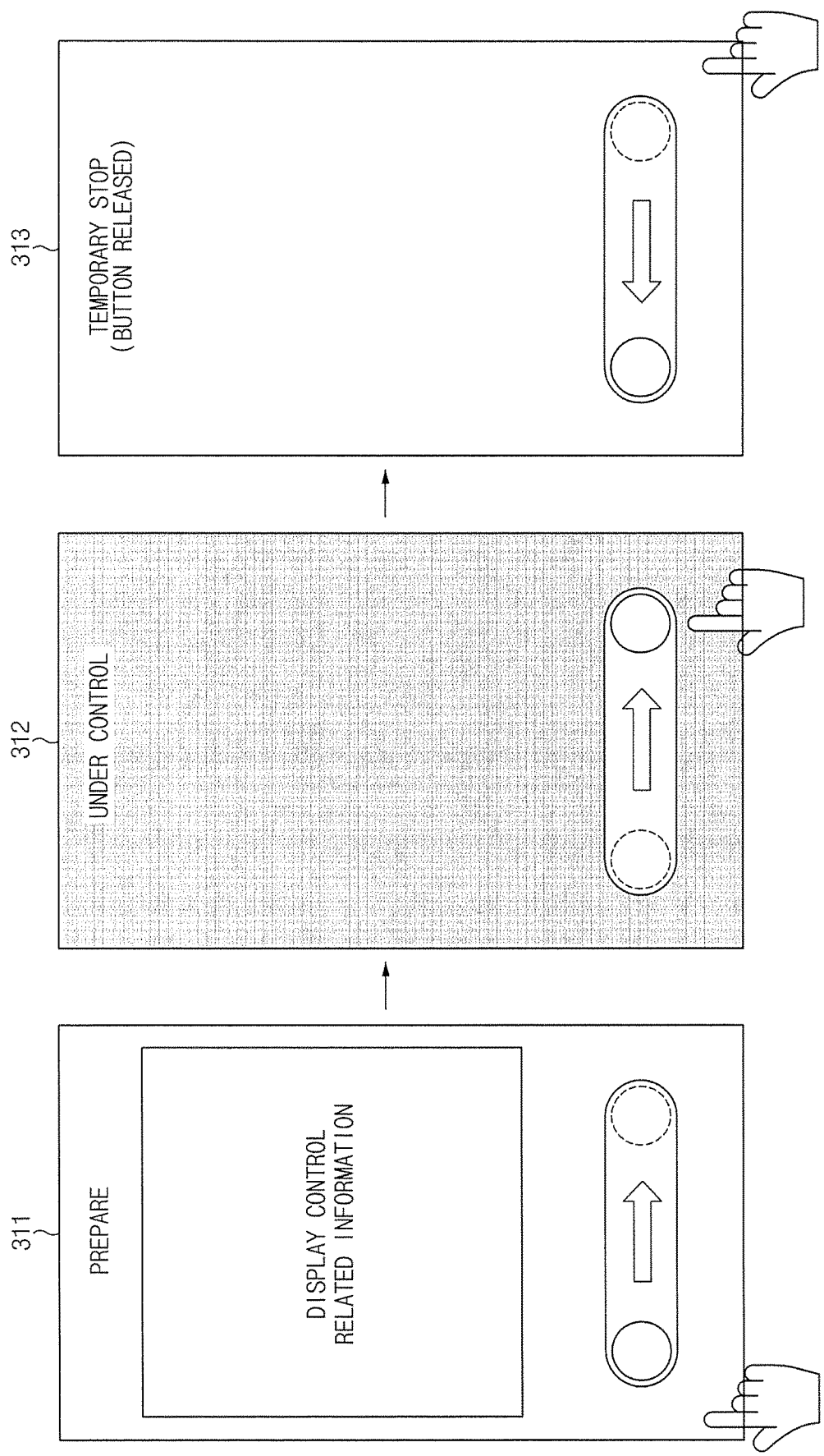

REMOTE PARKING CONTROL APPARATUS, SYSTEM INCLUDING THE SAME, AND METHOD THEREOF

CROSS-REFERENCE TO RELATED APPLICATION

This application is based on and claims the benefit of priority to Korean Patent Application No. 10-2018-0000761, filed on Jan. 3, 2018, in the Korean Intellectual Property Office, the disclosure of which is incorporated herein in its entirety by reference.

TECHNICAL FIELD

The present disclosure relates to a remote parking control apparatus, a system including the same, and a method thereof, and more particularly, to a technology of remotely controlling a vehicle by automatically determining a surrounding situation of the vehicle and providing a remote control system that is suitable for a driver.

BACKGROUND

Due to the development of electronic technology of vehicles, electronic control units that perform driving or parking instead of drivers have been widely applied to the vehicles.

Among them, in parking assistant systems, functions of braking/driving and gearshift also are automated in addition to conventional systems of controlling only a steering apparatus instead of the drivers. Moreover, remote parking systems that assist the drivers to park their vehicles by remotely manipulating the vehicles from outside through an apparatus while the drivers are not in the vehicles have been suggested.

In general, implementation of the functions of a parking assistant system that remotely controls parking is very limited because the parking assistant system is operated only when an input of the driver is made for parking control and the control has to be stopped if there is no input from the driver according to the rules and regulations.

That is, vehicles that provide existing remote parking functions provide only functions such as a simple on/off function of the parking assistant system and guide of the control state, but fail to provide a detailed vehicle control service such as forward movement, rearward movement, deceleration, and acceleration of the vehicle, and it is difficult to perform vehicle control by actively reflecting the intention of the driver.

SUMMARY

The present disclosure provides a remote parking control apparatus that may automatically determine a surrounding situation of a vehicle, may provide the user with a remote control mode that is suitable for the user, and may easily control even a speed of the vehicle during remote control of the vehicle, a system including the same, and a method thereof.

The technical objects of the present disclosure are not limited to the above-mentioned one, and the other unmentioned technical objects will become apparent to those skilled in the art from the following description.

In accordance with an aspect of the present disclosure, a remote parking control apparatus includes a communication device configured to perform wireless communication with a parking assistant system of a vehicle, a controller communicatively connected to the communication device and configured to constitute a remote control mode selection screen having one or more available remote control modes, and if one remote control mode of the one or more available remote control modes is selected, constitute a control mode screen corresponding to the selected remote control mode, and a display communicatively connected to the controller and configured to display the remote control mode selection screen having the one or more available remote control modes and the control mode screen.

The controller may include a soft button in the control mode screen, the soft button being controlled by moving a location thereof.

The controller may calculate a displacement value of a movement of the soft button if the soft button is moved by a body portion of a user.

The communication device may transmit the displacement value to the parking assistant system.

When the soft button is touched and moved by the body portion of the user and the body portion of the user is separated from the soft button, the controller may allow the soft button to return to an original location of the soft button and may determine that a control of the vehicle is stopped.

When the soft button is touched and moved by the body portion of the user and the body portion of the user is separated from the soft button, the controller may allow the soft button to stay at a current location of the soft button and may determine that a control of the vehicle is stopped.

When the soft button is moved by the body portion of the user from a location at which the soft button is stopped, the controller may calculate a displacement value from the location at which the soft button is stopped to a location to which the soft button is moved.

The display may differently display a color of a background screen of the control mode screen according to a vehicle control speed.

The remote parking control apparatus may further include a voice output device configured to output a notification sound when the soft button is moved, and a vibration output device configured to output vibration when the soft button is moved.

The voice output device may more rapidly output a cycle of the notification sound or output a voice guide as a vehicle control speed becomes higher.

The vibration output device may increase a frequency of the vibration or increase an intensity of the vibration as a vehicle control speed becomes higher.

The controller may constitute the control mode screen including at least one of a control progress degree until completion of a control of the vehicle, a vehicle control speed, a vehicle control direction, and vehicle surrounding image data.

The controller may constitute the control mode screen including vehicle surrounding image data mirrored from the parking assistant system.

The controller may constitute the soft button in at least one form of a vertical slide bar, a transverse slide bar, and a curved slide bar.

In accordance with another aspect of the present disclosure, a remote parking control system includes a parking assistant control apparatus configured to determine an available remote control mode based on a surrounding environment of a vehicle or a recently used control mode when receiving a remote control start signal, and a remote parking control apparatus configured to receive the available remote control mode from the parking assistant control apparatus to display a control mode screen including a soft button, and to transmit a displacement value according to movement of the soft button to the parking assistant control apparatus, in which the parking assistant control apparatus controls a movement direction and a speed of the vehicle by using the displacement value.

The parking assistant control apparatus may control the vehicle in a forward direction when the soft button is moved in a first direction, may control the vehicle in a rearward direction when the soft button is moved in a second direction, and may vary the speed of the vehicle according to a movement degree of the soft button.

The parking assistant control apparatus may determine the available remote control mode according to presence of left, right, front, and rear obstacles by detecting a periphery of the vehicle, or may determine an available remote control mode that is controlled to be opposite to the recently used control mode.

The remote parking control apparatus may include a communication device configured to perform wireless communication with the parking assistant control apparatus of the vehicle, a controller communicatively connected to the communication device and configured to constitute a remote control mode selection screen having one or more available remote control modes, and if one remote control mode of the one or more available remote control modes is selected, constitute a control mode screen corresponding to the selected remote control mode, and a display communicatively connected to the controller and configured to display the remote control mode selection screen having the one or more available remote control modes and the control mode screen.

In accordance with another aspect of the present disclosure, a remote parking control method includes constituting, by a controller, a remote control mode selection screen having one or more available remote control modes, displaying, by the controller through a display, a control mode screen including a soft button, which is controlled by moving a location thereof, when one of the one or more available remote control modes is selected, and transmitting, by a communication device communicatively connected to the controller, a displacement value of the soft button according to movement of the soft button to a parking assistant system of a vehicle.

The remote parking control method may further include remotely controlling the vehicle according to the displacement value.

BRIEF DESCRIPTION OF THE DRAWINGS

The above and other objects, features and advantages of the present disclosure will be more apparent from the following detailed description taken in conjunction with the accompanying drawings:

FIG. 4I is an exemplary view in which a remote parallel coming-out mode in a front/rear side blocking and one side opening situation are displayed through activation of display of a button according to an embodiment of the present disclosure;

FIG. 5 is an exemplary view of a remote control screen according to an embodiment of the present disclosure;

DETAILED DESCRIPTION

Figure 1:
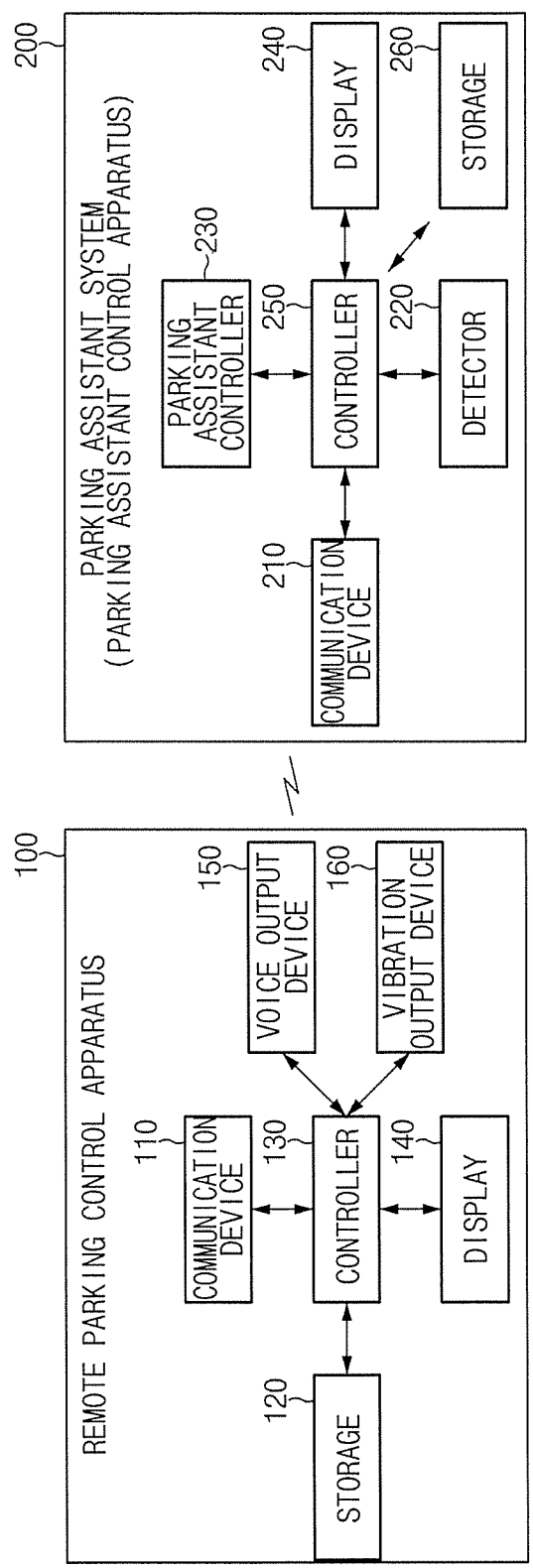
FIG. 1 is a diagram of a remote parking control system according to an embodiment of the present disclosure.

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific taws, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Hereinafter, exemplary embodiments of the present disclosure will be described in detail with reference to FIGS. 1 to 17.

Figure 2:
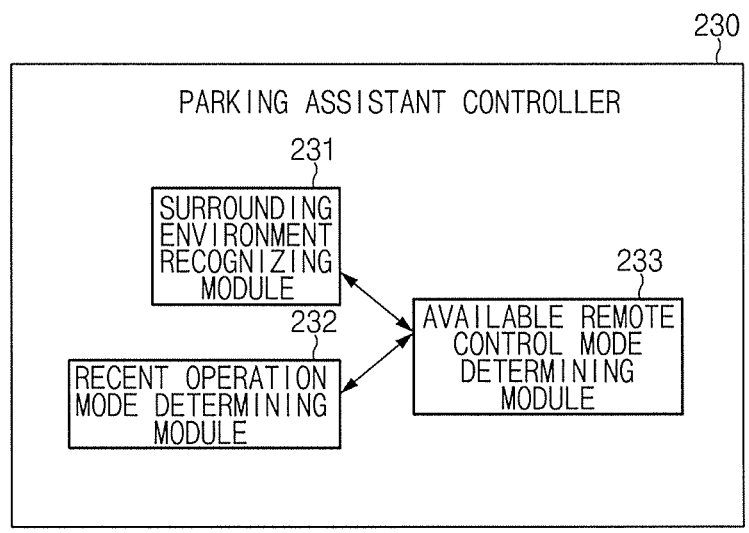
FIG. 2 is a detailed diagram of a parking assist controller according to an embodiment of the present disclosure.
Figure 3:
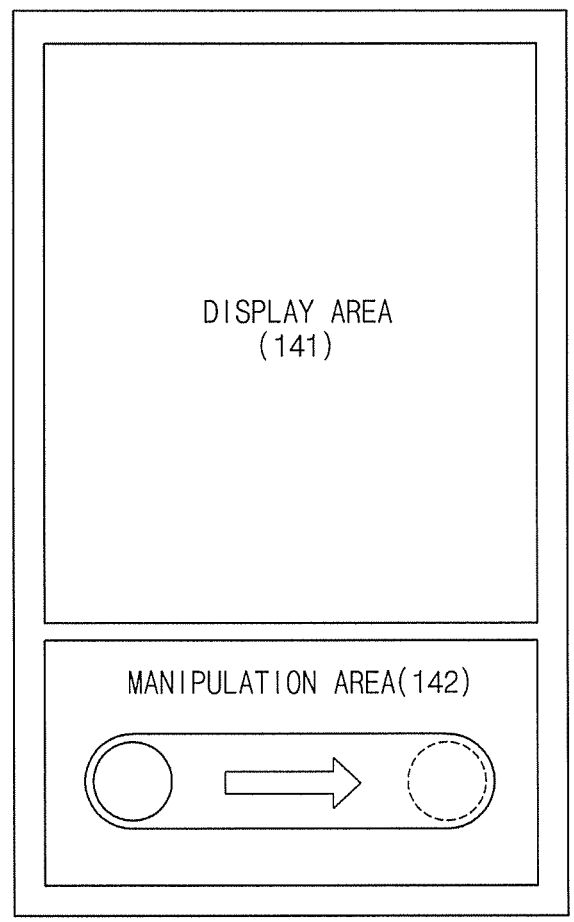
FIG. 3 is an exemplary view of displaying a control screen of a remote parking control apparatus according to an embodiment of the present disclosure.
Figure 4A:
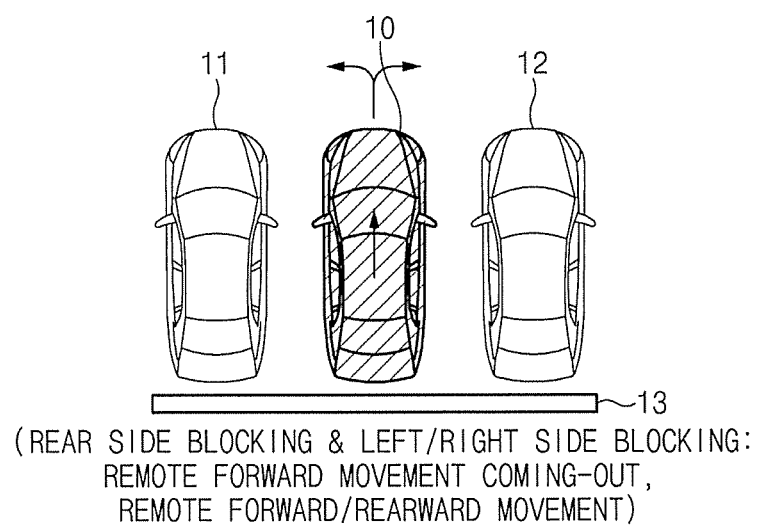
FIG. 4A is an exemplary view in which a remote forward movement/coming-out mode and a remote forward/rearward movement mode in a rear side blocking and left/right side blocking situation are displayed according to an embodiment of the present disclosure.
Figure 4B:
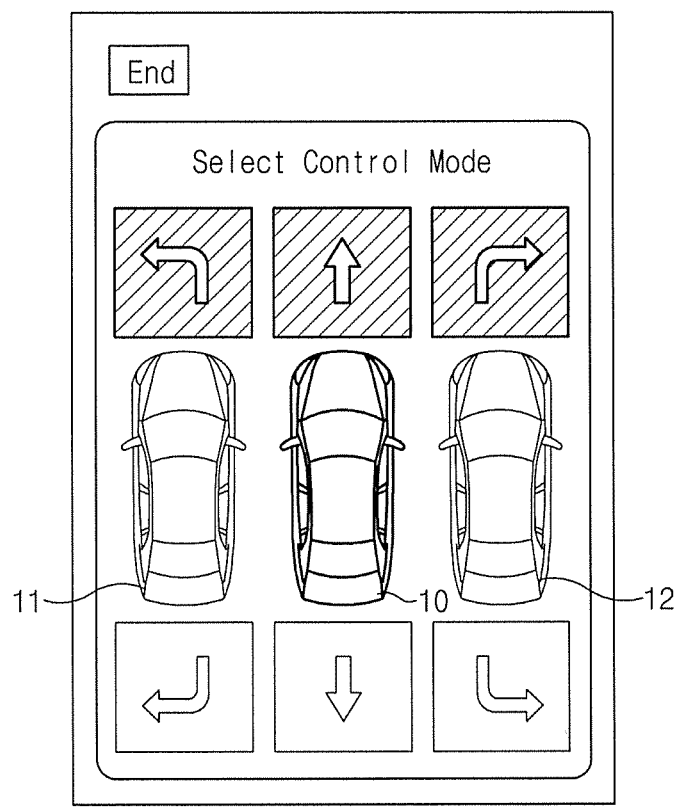
FIG. 4B is an exemplary view in which a remote forward movement/coming-out mode and a remote forward/rearward movement mode in a rear side blocking and left/right side blocking situation are displayed through activation of display of a button according to an embodiment of the present disclosure.
Figure 4C:
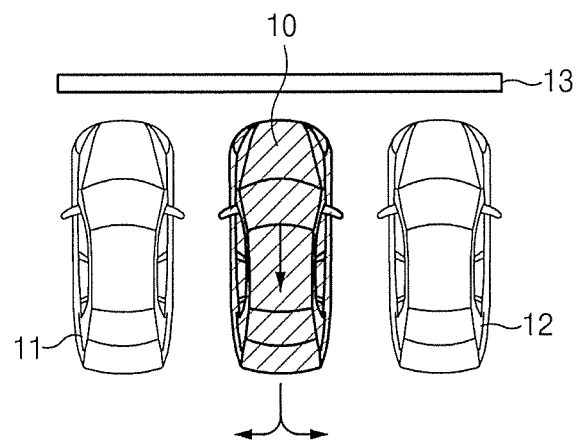
FIG. 4C is an exemplary view in which a remote rearward movement/coming-out mode and a remote forward/rearward movement mode in a front side blocking and left/right side blocking situation are displayed according to an embodiment of the present disclosure.
Figure 4D:
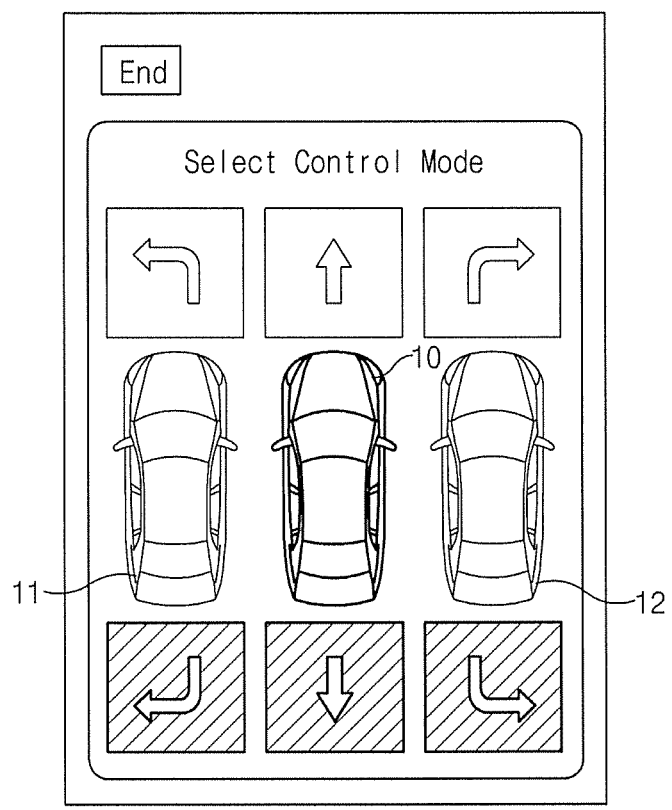
FIG. 4D is an exemplary view in which a remote rearward movement/coming-out mode and a remote forward/rearward movement mode in a front side blocking and left/right side blocking situation are displayed through activation of display of a button according to an embodiment of the present disclosure.
Figure 4E:
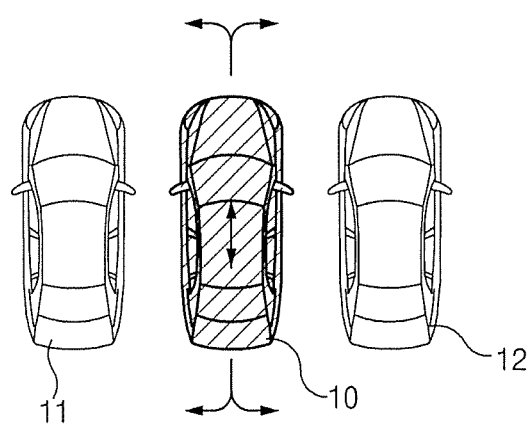
FIG. 4E is an exemplary view in which a remote rearward movement/coming-out mode, a remote forward movement/coming-out mode, and a remote forward/rearward movement mode in a left/right side blocking and left/right side opening situation are displayed according to an embodiment of the present disclosure.
Figure 4F:
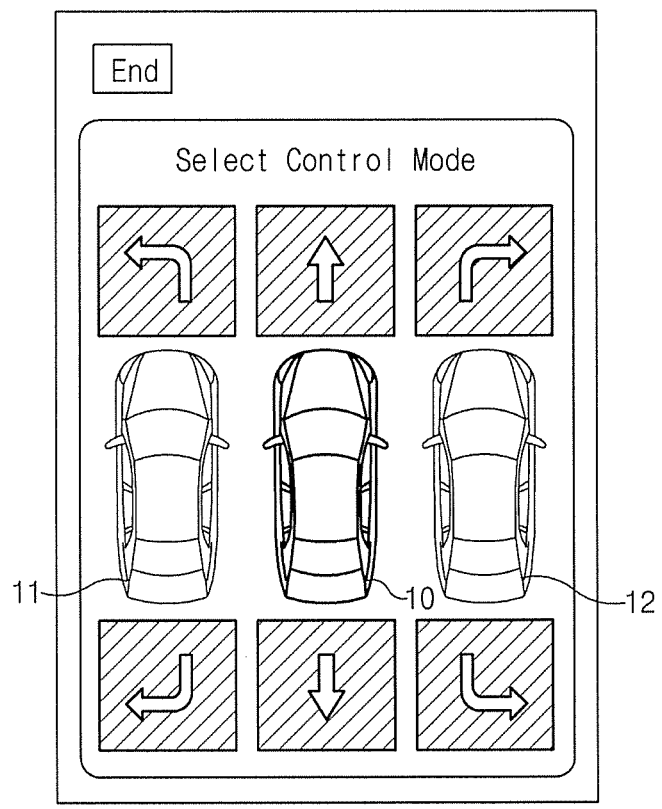
FIG. 4F is an exemplary view in which a remote rearward movement/coming-out mode, a remote forward movement/coming-out mode, and a remote forward/rearward movement mode in a left/right side blocking and left/right side opening situation are displayed through activation of display of a direction button according to an embodiment of the present disclosure.
Figure 4G:
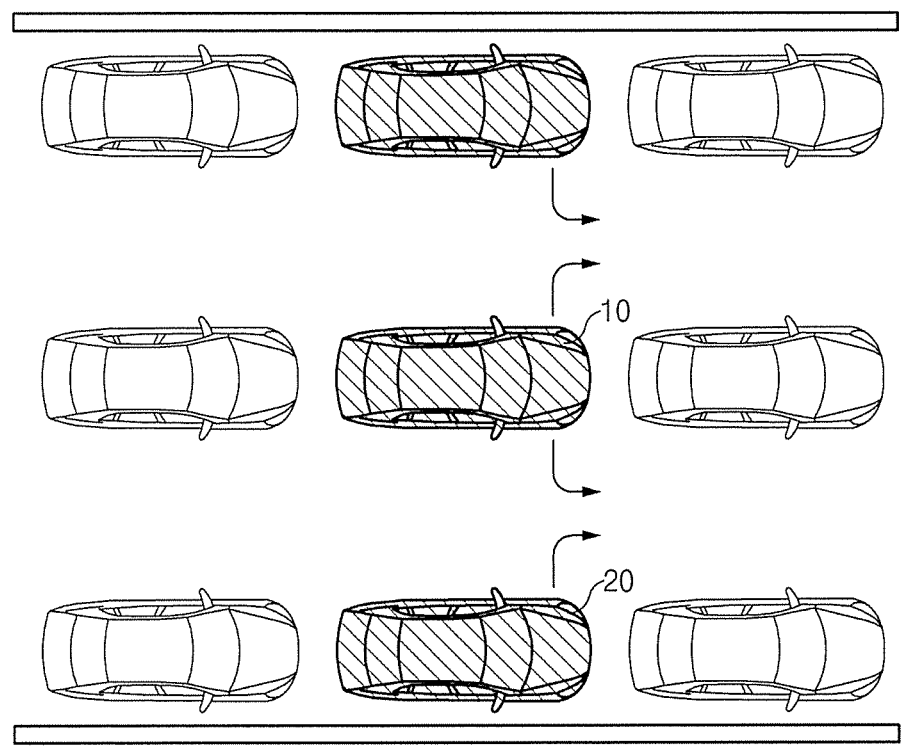
FIG. 4G is an exemplary view in which a remote parallel coming-out mode is displayed in a situation in which front and rear sides of the vehicle are blocked and at least one of left and right sides of the vehicle is opened according to an embodiment of the present disclosure.
Figure 4H:
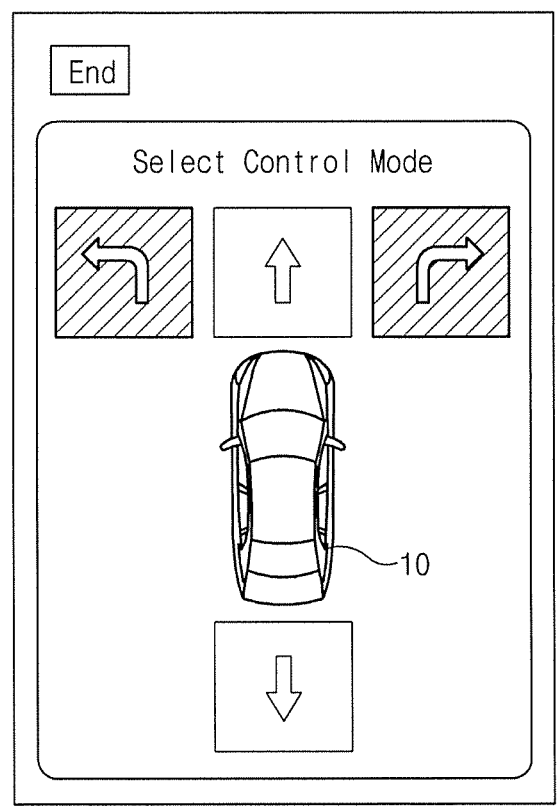
FIG. 4H is an exemplary view in which a remote parallel coming-out mode in a front/rear side blocking and left/right side opening situation are displayed through activation of display of a button according to an embodiment of the present disclosure.
Figure 41:
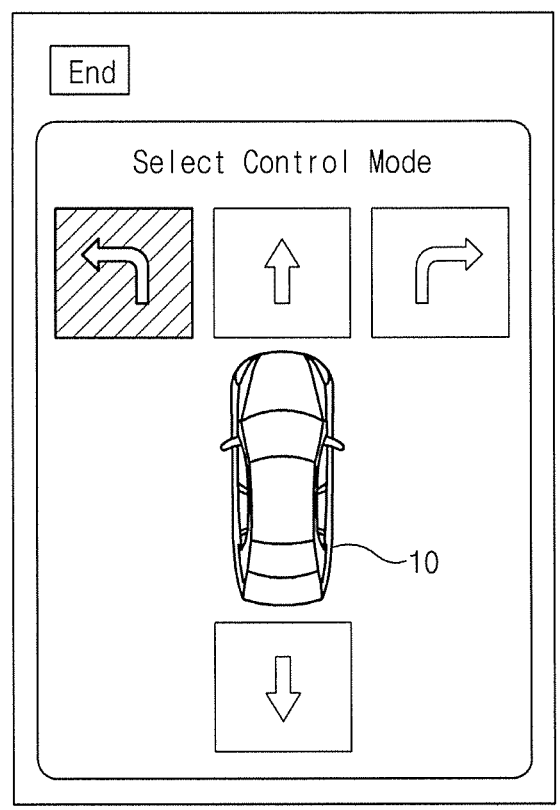
Figure 4J:
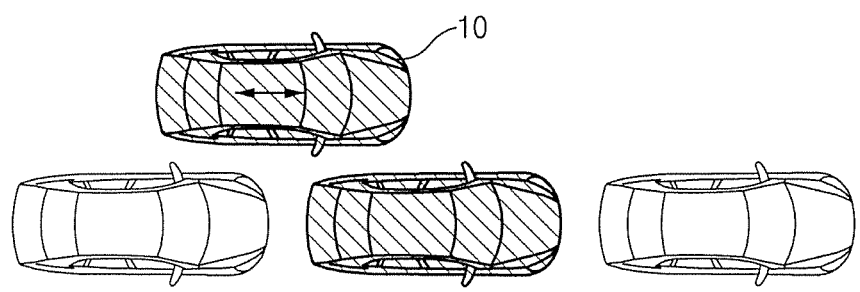
FIGS. 4J and 4K are exemplary views displaying a remote forward/rearward movement mode in a one side blocking and forward/rearward movement distance existing situation.
Figure 4K:
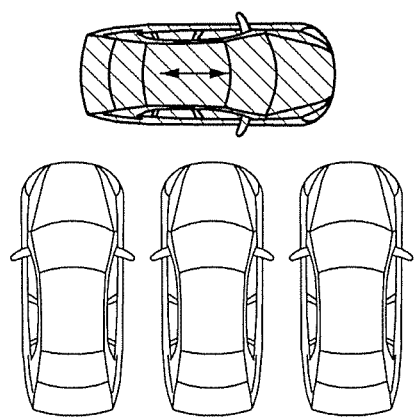
Figure 4L:
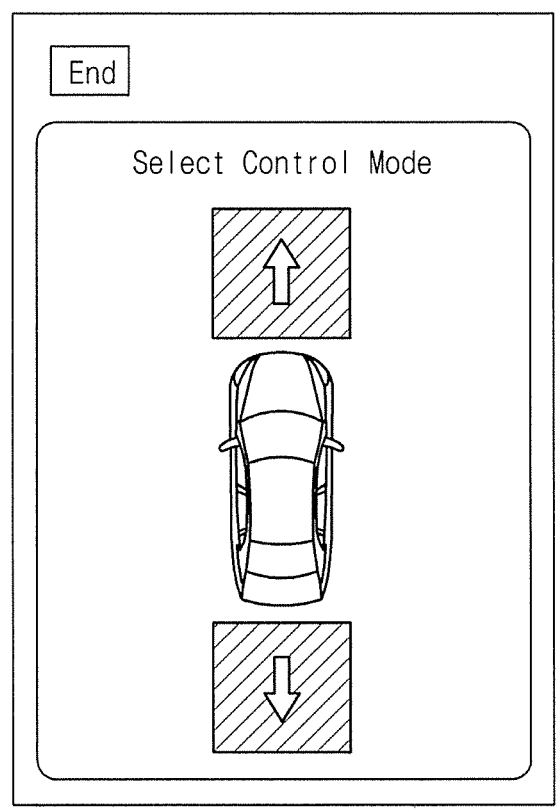
FIG. 4L is an exemplary view in which a remote forward/rearward movement mode is displayed in a one side blocking and forward/rearward movement distance existing situation through activation of display of a direction button.

FIG. 1 is a diagram of a remote parking control system according to an embodiment of the present disclosure. FIG. 2 is a detailed diagram of a parking assist controller according to an embodiment of the present disclosure. FIG. 3 is an exemplary view of displaying a control screen of a remote parking control apparatus according to an embodiment of the present disclosure. FIG. 4A is an exemplary view in which a remote forward movement/coming-out mode and a remote forward/rearward movement mode in a rear side blocking and left/right side blocking situation are displayed according to an embodiment of the present disclosure. FIG. 4B is an exemplary view in which a remote forward movement/coming-out mode and a remote forward/rearward movement mode in a rear side blocking and left/right side blocking situation are displayed through activation of display of a button according to an embodiment of the present disclosure. FIG. 4C is an exemplary view in which a remote rearward movement/coming-out mode and a remote forward/rearward movement mode in a front side blocking and left/right side blocking situation are displayed according to an embodiment of the present disclosure. FIG. 4D is an exemplary view in which a remote rearward movement/coming-out mode and a remote forward/rearward movement mode in a front side blocking and left/right side blocking situation are displayed through activation of display of a button according to an embodiment of the present disclosure. FIG. 4E is an exemplary view in which a remote rearward movement/coming-out mode, a remote forward movement/coming-out mode, and a remote forward/rearward movement mode in a left/right side blocking and left/right side opening situation are displayed according to an embodiment of the present disclosure. FIG. 4F is an exemplary view in which a remote rearward movement/coming-out mode, a remote forward movement/coming-out mode, and a remote forward/rearward movement mode in a left/right side blocking and left/right side opening situation are displayed through activation of display of a direction button according to an embodiment of the present disclosure. FIG. 4G is an exemplary view in which a remote parallel coming-out mode is displayed in a situation in which front and rear sides of the vehicle are blocked and at least one of left and right sides of the vehicle is opened according to an embodiment of the present disclosure. FIG. 4H is an exemplary view in which a remote parallel coming-out mode in a front/rear side blocking and left/right side opening situation are displayed through activation of display of a button according to an embodiment of the present disclosure. FIG. 4I is an exemplary view in which a remote parallel coming-out mode in a front/rear side blocking and one side opening situation are displayed through activation of display of a button according to an embodiment of the present disclosure. FIGS. 4J and 4K are exemplary views displaying a remote forward/rearward movement mode in a one side blocking and forward/rearward movement distance existing situation. FIG. 4L is an exemplary view in which a remote forward/rearward movement mode is displayed in a one side blocking and forward/rearward movement distance existing situation through activation of display of a direction button.

Referring to FIG. 1, a remote parking control system according to an embodiment of the present disclosure includes a remote parking control apparatus 100 for remotely control a parking assistant system 200 of a vehicle.

The remote parking control apparatus 100 receives an available remote control mode from the parking assistant system 200 (or a parking assistant control apparatus), displays a control mode screen including a soft button, which is controlled by moving a location thereof, and transmits a displacement value according to movement of the soft button to the parking assistant system 200 of the vehicle. The remote parking control apparatus 100 may include all mobile devices, such as a smartphone, a tablet personal computer (PC), a mobile phone, a video phone, an e-book reader, a netbook computer, a personal digital assistant (FDA), a portable multimedia player (PMP), a mobile communication terminal, a personal digital assistant (PDA), and an electronic notebook, which may be carried. Further, the remote parking control apparatus 100 may be realized to perform remote vehicle control by installing a separate application for a remote vehicle control service and executing the application. The application for the remote vehicle control service may be downloaded through wireless communication or the internet, and may be automatically installed after being downloaded.

To achieve this, the remote parking control apparatus 100 includes a communication device 110, a storage 120, a controller 130, a display 140, a voice output device 150, and a vibration output device 160.

The communication device 110 is a hardware device implemented with various electronic circuits to transmit and receive signals via wireless connections. The communication device 110 performs wireless communication with the parking assistant system 200 of the vehicle.

The communication device 110 may include various communication devices including a mobile communication device, a broadcasting receiving device, such as a DMB module or a DVB-H module, a short-range communication device, a ZigBee module that is a Bluetooth module or an NEC module, and a Wi-Fi communication device.

The storage 120 may store a control mode screen configured for remote control, an available remote control mode selection screen, and a displacement value according to a movement of the soft button. The storage 120 may include a memory, such as a flash memory type, a hard disk type, a micro type, or a card type (for example, a secure digital (SD) card or an eXtream digital (XD) card), and a storage medium of at least one of memories, such as a random access memory (RAM), a static RAM (SRM), a read-only memory (ROM), a programmable ROM (PROM), an electrically erasable PROM (EEPROM), a magnetic RAM (MRAM), a magnetic disk, and an optical disk.

The controller 130 is an electric circuitry that executes instructions of software which thereby performs various functions described hereinafter. The controller 130 constitutes a remote control mode selection screen having one or more available remote control modes, and, if one of the one or more available remote control modes is selected by a user, constitutes a control mode screen corresponding to the selected control mode. The controller 130 controls overall operations of the elements. Then, as in FIG. 3, the control mode screen includes a display area 141 and a manipulation area 142, and control related information, vehicle surrounding image data, and the like are displayed in the display area 141 and the manipulation area 142 is provided with a soft button for manipulation.

The controller 130 includes a soft button when the control mode screen is constituted, and allows the user to manipulate the soft button and input a command. The soft button of the controller 130 may be constituted in one or more various forms, such as a vertical slide bar, a transverse slide bar, and a curved slide bar. If the soft button is moved by the body portion of the user, the controller 130 may calculate a displacement value of the movement of the soft button, and may perform a control to transmit the displacement value to the parking assistant system 200 through the communication device 110. If the soft button is pressed, touched, and moved by a finger (the body portion) of the user, the controller 130 calculates a displacement value in the movement direction, and if the finger of the user is separated from the soft button, the soft button returns to an original location so that the controller 130 determines that the control is stopped as the displacement value of the soft button becomes 0. Then, the controller 130 may generate a remote command for the vehicle based on the displacement value, and may transmit the remote command for the vehicle to the parking assistant system 200 through the communication device 110.

If the soft button is touched by the body portion of the user to be moved in a first direction and the finger of the user is separated from the soft button, the controller 130 determines that the control is stopped and fixes the location of the soft button at the time point at which the control is stopped, and if the finger of the user is moved from the fixed location in a second direction again, a displacement value from the fixed location to the moved location is calculated. Further, the controller 130 may differently constitute the color of a background screen of the control mode screen according to a vehicle control speed when the control mode screen is constituted, and the control mode screen, the color of which is differently constituted by the controller 130 may be displayed through the display 140.

Further, the controller 130 may include at least one of a control progress degree until the completion of the control of the vehicle, a vehicle control speed, a vehicle control direction, and vehicle surrounding image data to constitute the control mode screen. Then, the vehicle surrounding image data may be image data of a parking area mirrored from the parking assistant system 200. The display 140 displays a control mode screen including a soft button and an available remote control mode selection screen. Then, although the present disclosure illustrates a soft button of one slide bar fault, the present disclosure is not limited thereto but may be realized by a plurality of soft buttons and various forms of soft buttons. Further, when a plurality of soft buttons are realized, they may be arranged in various forms, and may provide unique textures through a vibration feedback and a notification sound feedback.

The display 140 may include at least one of a liquid crystal display (LCD), a thin film transistor (TFT) LCD, a light emitting diode (LED), an organic LED, an active matrix OLED (AMOLED), a flexible display, a bended display, and a 3D display. Among them, some displays may be realized by transparent displays that are configured in a transparent or light-transmitting way such that the outside is visible. Further, in the present disclosure, the display 140 is provided as a touchscreen including a touch panel and may be used as an input device (manipulation of a soft button) as well as an output device.

The voice output device 150 outputs a notification sound when the soft button is moved. The voice output device 150 may promptly output a cycle of the notification sound as the vehicle control speed becomes higher. For example, when the speed of the vehicle is slow, a notification sound may be output at a low cycle such as "Beep . . . Beep . . . Beep", and when the speed of the vehicle is high, the notification sound may be output at a high cycle such as "BeepBeepBeepBeepBeep". Further, the voice output device 150 may output a voice guide such as "The movement speed of the vehicle becomes higher".

The voice output device 160 outputs a vibration when the soft button is moved. As the vehicle control speed becomes higher, the vibration output device 160 may increase the frequency of the vibration or increase the intensity of the vibration.

If receiving a remote control start signal from the remote parking control apparatus 100, the parking assistant system 200 may determine the available remote control mode based on a surrounding environment or a recently used control mode (or a final control mode). To achieve this, the parking assistant system 200 includes a communication device 210, a detector 220, a parking assistant controller 230, a display 240, a controller 250, and a storage 260.

The communication device 210 is a hardware device implemented with various electronic circuits to transmit and receive signals via wireless connections. The communication device 210 performs wireless communication with the remote parking control apparatus 100.

The communication device 210 may include various communication devices including a mobile communication device, a broadcasting receiving device, such as a DMB module or a DVB-H module, a short-range communication device, a ZigBee module that is a Bluetooth module or an NEC module, and a Wi-Fi communication device.

The detector 220 detects a vehicle surrounding situation, and may include a camera, an ultrasonic sensor, and a laser radar sensor.

The parking assistant controller 230 determines an available remote control mode by determining an obstacle around the vehicle detected by the detector 220. Further, the parking assistant controller 230 may determine an available remote control mode based on the final control mode.

The display 240 may display vehicle surrounding situation data or image data.

The controller 250 controls overall operations of the elements.

The storage 260 may store vehicle surrounding situation data, image data, and available remote control mode.

Referring to FIG. 2, the parking assistant controller 230 is an electric circuitry that executes instructions of software which thereby performs various functions of following modules including a surrounding environment recognizing module 231, a recent operation mode determining module 232, and an available remote control mode determining module 233.

The surrounding environment recognizing module 231 determines an obstacle around the vehicle from a result detected by the detector 220.

The recent operation mode determining module 232 determines a final remote control mode.

The available remote control mode determining module 233 may determine an available remote control mode based on the surrounding environment information recognized by the surrounding environment recognizing module 231 and the final remote control mode determined by the recent operation mode determining module 232.

Then, the available remote control mode corresponds to rear side blocking and left/right side blocking so that the host vehicle may perform only a forward movement coming-out mode in a mode in which a remote control is possible, that is, parked vehicles 11 and 12 are present on the left and right sides of the host vehicle 10 and the rear side is a wall surface 13 as in FIGS. 4A and 4B. FIGS. 4C and 4D correspond to a case of front side blocking and left/right side blocking, and correspond to a case in which a remote rearward movement coming-out mode is possible. In FIGS. 4E and 4F, vehicles 11 and 12 are present but the front and rear sides are opened, and accordingly, a remote forward/rearward movement mode, a remote forward movement and coming-out mode, and a remote rearward movement and coming-out mode are possible. FIG. 4G corresponds to a case in which vehicles are parked in a row, and because the vehicles are present on the front and rear sides of the host vehicle 10 so that the front and rear sides are blocked and a minimum of one of the left and right sides is opened, a remote parallel coming-out mode is possible. FIG. 4H represents that the vehicle, of which both the left and right sides are opened, may move to the left and right sides, and it can be seen that only directions (left and right sides) in which an arrow in the form of a soft button may move are activated. It can be seen from FIG. 4I that the vehicle 20, of which only the left side is opened, may move to the left side and only an arrow for the left direction is activated. FIGS. 4J and 4K correspond to a case in which one side of the vehicle is blocked and the vehicle may be moved forwards and rearwards, and the remote forward/rearward movement mode may be selected as an available remote control mode. It can be seen from FIG. 4L that the arrows for the forward and rearward directions of the vehicle are activated. As in FIGS. 4A to 4L, the available remote control mode screen may be displayed on the screen of the remote parking control apparatus 100, and movement of the vehicle in the corresponding direction may be controlled if the user selects one of the activated arrow buttons.

For example, if the final parking control mode is a right angle rearward movement parking mode, the available remote control mode determining device 233 determines the right angle forward movement coming-out mode as the available remote control mode. Further, if the final parking control mode is a parallel rearward movement parking mode, a forward movement parallel coming-out mode is determined as the available remote control mode. If the final parking control mode is a remote forward/rearward movement mode, a remote forward/rearward movement mode is selected as the available remote control mode.

In this way, the present disclosure is a technology of remotely controlling the parking assistant system 200 through the remote parking control apparatus 100, and the parking assistant system 200 determines the available remote control mode based on a surrounding situation and a final control mode, the remote parking control apparatus 100 calculates a movement degree, a displacement value, and the like of the soft button and provides the calculated values to the parking assistant system 200 if one of the available remote control modes is selected by the user so that the soft button is moved, and the parking assistant system 200 may control a movement direction and a speed of the vehicle according to a movement degree and a displacement value of the soft button.

Hereinafter, an example of remote control will be described with reference to FIGS. 5 to 15.

FIG. 5 is an exemplary view of a remote control screen according to an embodiment of the present disclosure.

Referring to FIG. 5, the soft button is a transverse slide type, the soft button is located (initial location) on the left side in a preparation screen 311, and if a finger of the user is moved to the right end while the soft button is pressed as in the screen 312 during control, the displacement value of the soft button is calculated and is transmitted to the parking assistant system 200 so that the control of the vehicle may be performed. Then, when the finger of the user continues to press the soft button, the control of the vehicle continues, and if the finger of the user is separated from the soft button, the soft button returns to the left end location (initial location) as in a temporary stop screen 313. Then, the displacement value the soft button may be transmitted to the parking assistant system 200 whenever the soft button is moved. Although FIG. 5 discloses an example in which the slide bar is located at a lower end of the screen, the present disclosure is not limited thereto, but may be located at any part, including an upper end, a middle end, and a lower end of the screen in a form that may be easily touched by the user.

Figure 6:
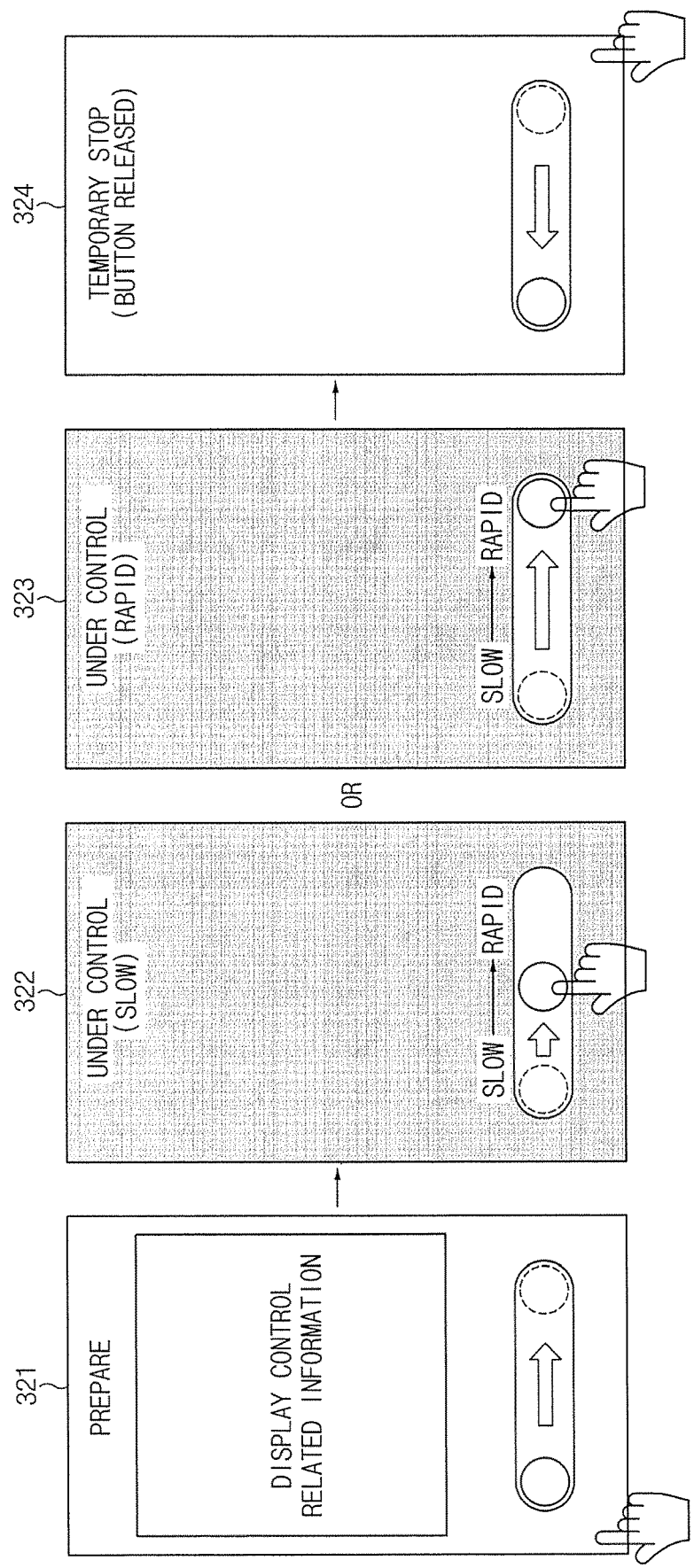
FIG. 6 is an exemplary view of a remote control mode screen for varying a vehicle speed according to an embodiment of the present disclosure.

FIG. 6 is an exemplary view of a remote control mode screen for varying a vehicle speed according to an embodiment of the present disclosure. Referring to FIG. 6, it means that the soft button is located at the left end of the slide bar in a preparation screen 321, the soft button is moved to the right side of the slide bar but is moved only to a middle part so that the speed of the vehicle is controlled to be slow in a slow movement screen 322, and the soft button is moved to the right end of the slide bar in a rapid movement screen 323. As the soft button is closer to the left side of the slide bar, the speed of the vehicle is controlled to be slower, and as the soft button is closer to the right side of the slide bar, the speed of the vehicle is controlled to be rapider. Thereafter, if the control is completed in a temporary stop screen 324 and the finger of the user is separated from the soft button, the soft button returns to an initial location. Then, as the remote parking control apparatus 100 transmits the movement degree (based on the displacement value) of the soft button to the parking assistant system 200, the parking assistant system 200 may determine the speed of the vehicle according to the movement degree of the soft button.

Figure 7:
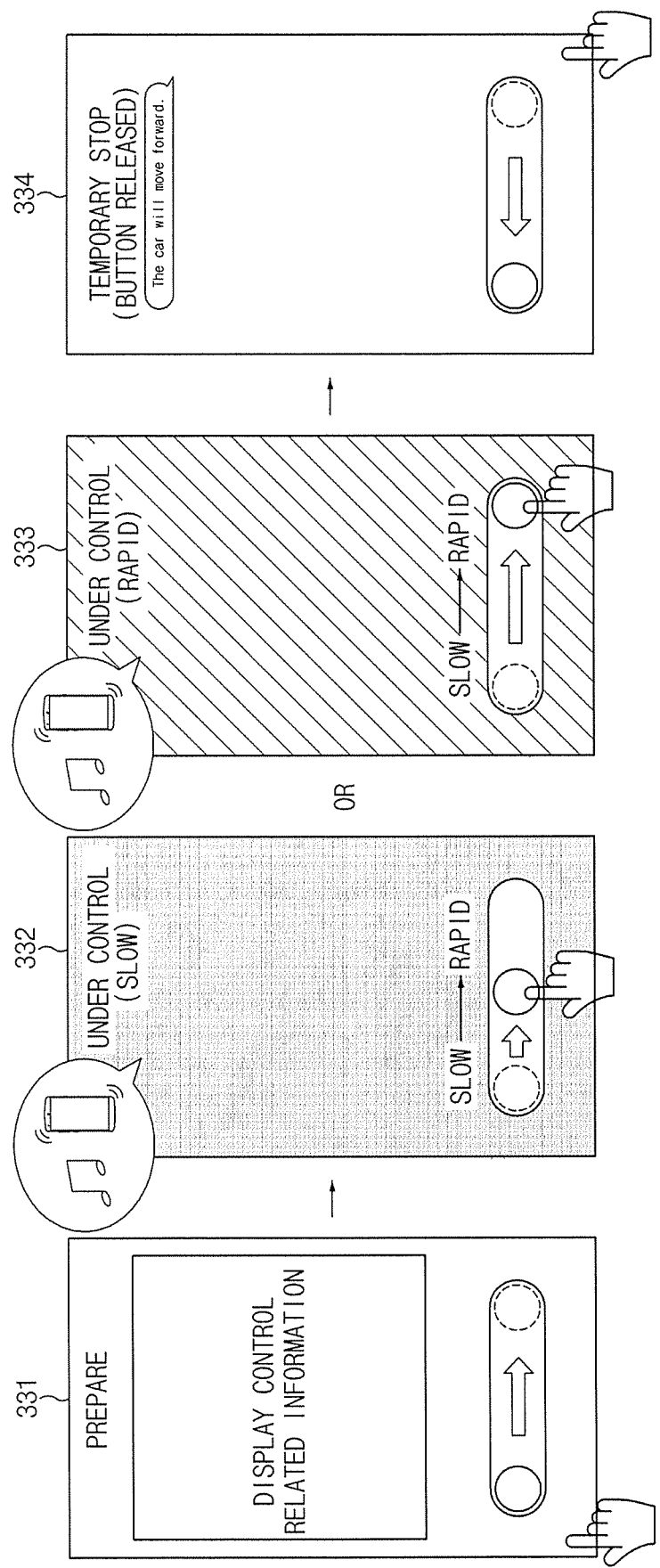
FIG. 7 is an exemplary view of a haptic function in a remote control mode for varying a vehicle speed according to an embodiment of the present disclosure.

FIG. 7 is an exemplary view of a haptic function in a remote control mode for varying a vehicle speed according to an embodiment of the present disclosure. Referring to FIG. 7, if a control mode is started when the screen is changed to the screens 332 and 333 during control in a state of the preparation screen 331, that is, the soft button deviates from an initial location, a notification sound or vibration is output so that the user may recognize that the remote control mode is being operated without viewing the screen. For example, as the vehicle control speed becomes higher, the number of vibrations or the intensity of vibration may increase, and as the vehicle control speed becomes higher, the cycle of the notification sound may be output rapider. Further, the color of the background screen may be differently displayed according to the speed of the vehicle.

Figure 8:
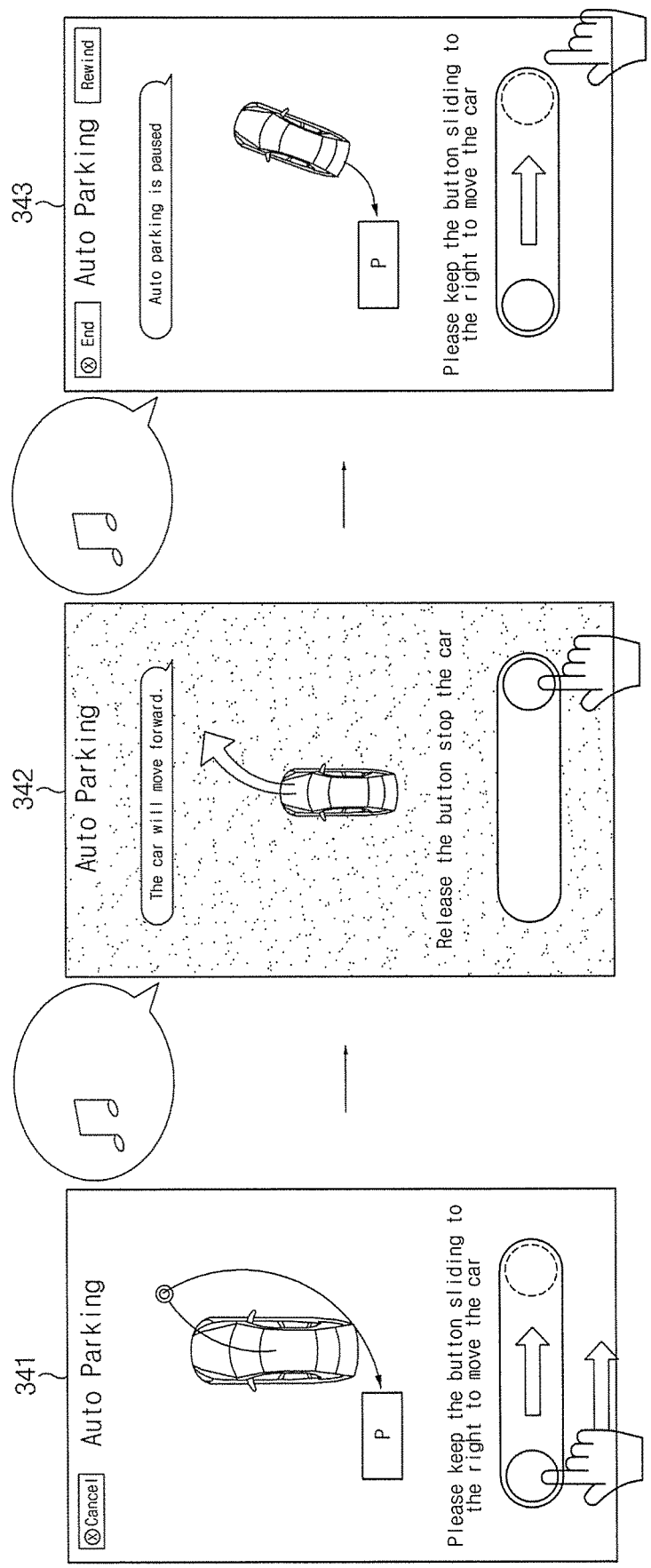
FIG. 8 is an exemplary view of a remote control screen displaying control related information according to an embodiment of the present disclosure.

FIG. 8 is an exemplary view of a remote control screen displaying control related information according to an embodiment of the present disclosure. Referring to FIG. 8, control related information may be displayed in a remote control mode screen. Then, a preparation screen 341 displays that the vehicle is being parked, a under-control screen 342 displays a progress direction of the vehicle with an arrow, and a stop screen 343 displays that the parking of the vehicle is stopped. Then, the remote parking control apparatus may provide a voice guide such that the user may know that the remote control is being operated without viewing the screen. Further, the control related information may represent a control progress degree in various forms such as a gauge, a percent (%), and a graph.

Figure 9:
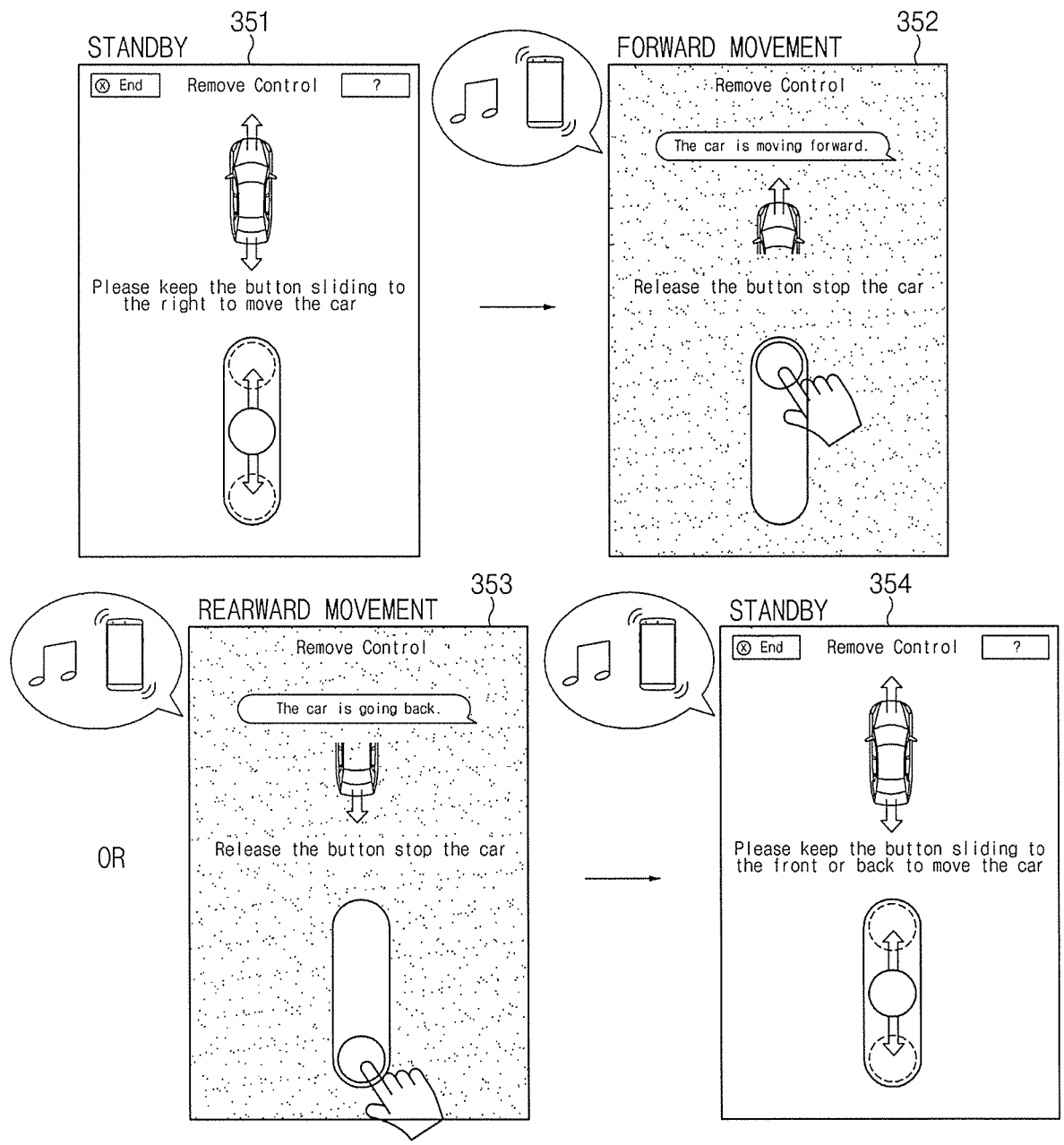
FIG. 9 is another exemplary view of a remote control screen displaying control related information according to an embodiment of the present disclosure.

FIG. 9 is an exemplary view of a remote control screen displaying control related information according to an embodiment of the present disclosure. FIG. 9 illustrates an example of displaying control related information as in FIG. 8 but displaying a slide bar vertically, and a soft button is located at the center of a slide bar in a preparation screen 351 and the soft button is moved such that the screen is changed to control screens 352 and 353. Then, when the soft button is moved to the upper side of the slide bar, it corresponds to forward movement control of the vehicle, and when the soft button is moved to the lower side of the slide bar, it may be matched as rearward movement control of the vehicle. Thereafter, if a finger of the user is separated from the soft button, the soft button returns to an initial location as in a stop screen 354.

Figure 10:
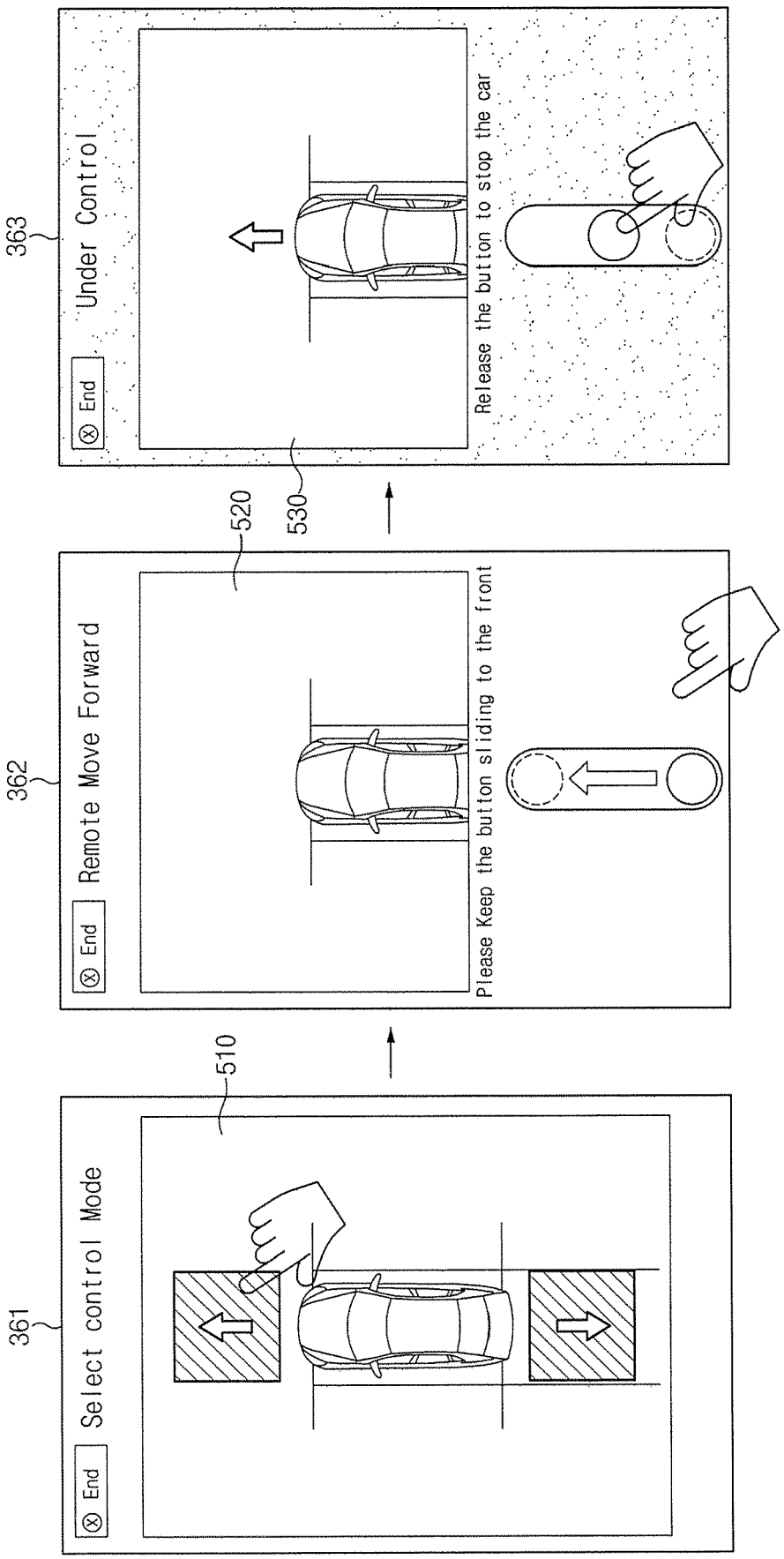
FIG. 10 is an exemplary view of a remote control screen including mirroring of a camera image according to an embodiment of the present disclosure.

FIG. 10 is an exemplary view of a remote control screen including mirroring of a camera image according to an embodiment of the present disclosure. Referring to FIG. 10, an available remote control mode is displayed by using camera image data 510 provided by a parking assistant system 200. A screen 361 is an example of activating and displaying a progress direction arrow button in an available remote control mode, and a screen 362 is a screen in which camera image data 520 provided by the parking assistant system 200 overlaps a slide bar to be displayed together with a guide message. A screen 363 represents a case in which the soft button is moved upwards and the vehicle moves forwards. The convenience of the user may be improved by providing an actual image screen as in FIG. 10.

Figure 11:
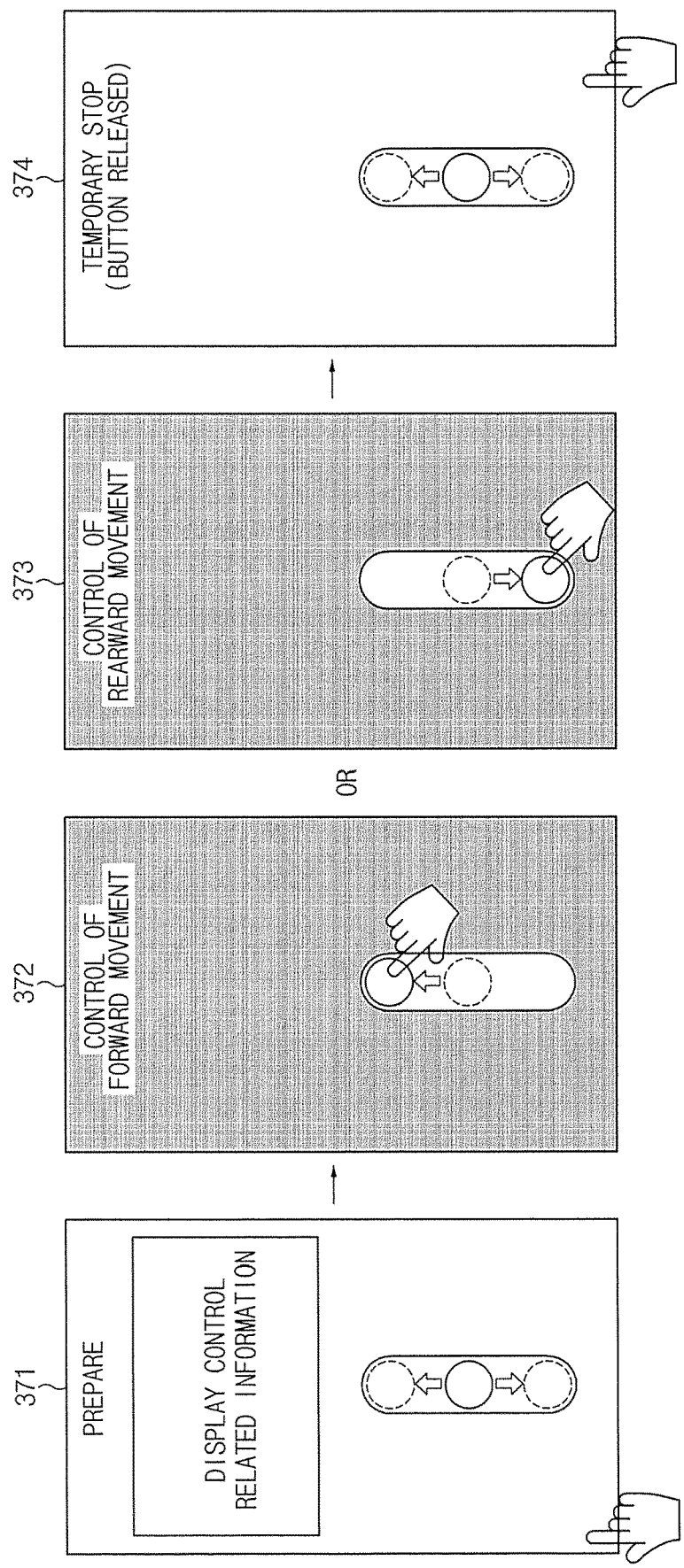
FIG. 11 is an exemplary view of a remote control screen including a soft button of a vertical slide bar form according to an embodiment of the present disclosure.

FIG. 11 is an exemplary view of a remote control screen including a soft button of a vertical slide bar form according to an embodiment of the present disclosure. Referring to FIG. 11, in a state of a preparation screen 371, a soft button is located at the center of a slide bar. The soft button is located at the uppermost end of the slide bar in a forward movement control screen 372, and the soft button is located at the lowermost end of the slide bar in the rearward movement control screen 373. In a temporary stop screen 374, a finger of the user is separated from the soft button and the soft button is located at the center of the slide bar that is an initial location.

Figure 12:
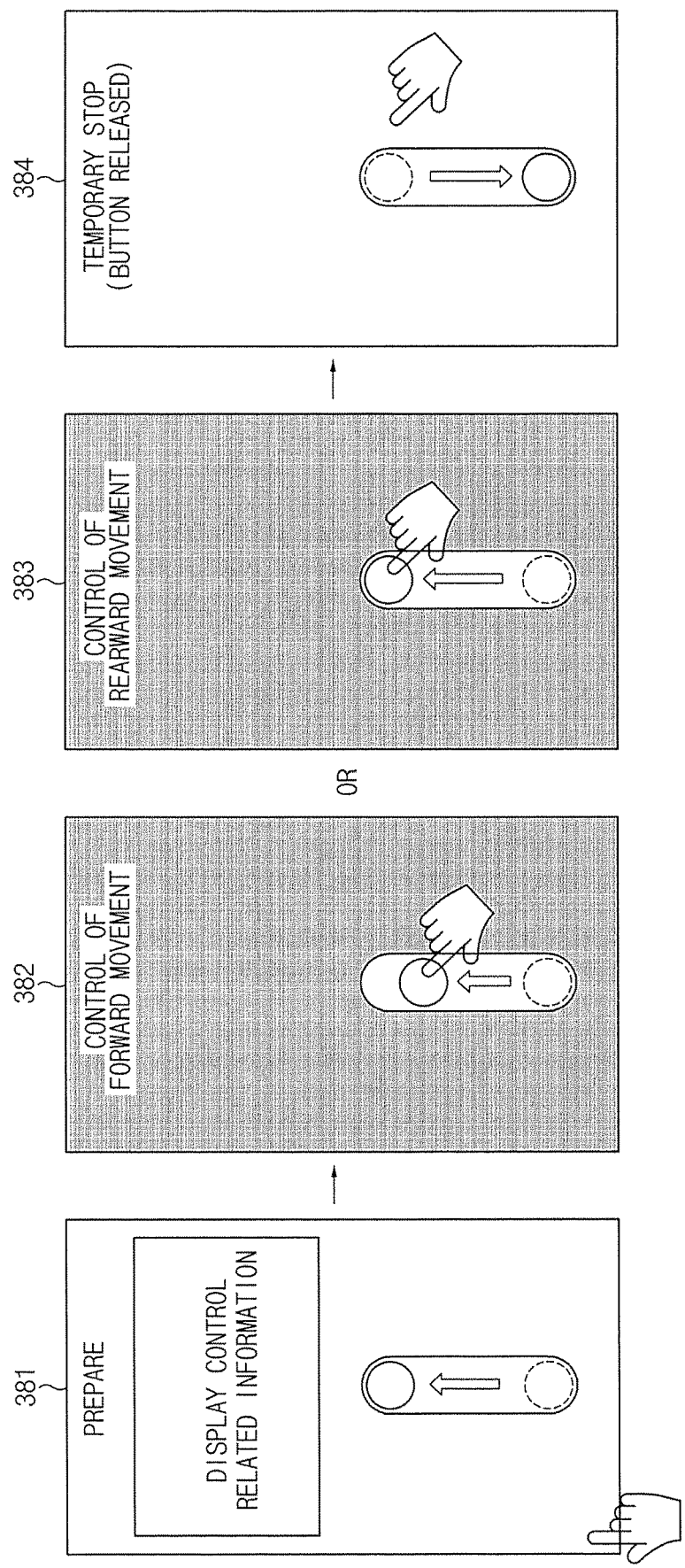
FIG. 12 is an exemplary view of a vehicle speed control screen in a remote forward movement mode according to an embodiment of the present disclosure.

FIG. 12 is an exemplary view of a vehicle speed control screen in a remote forward movement mode according to an embodiment of the present disclosure. Referring to FIG. 12, it can be seen that ua soft button is located at the lowermost end of a slide bar in a preparation screen 381, is located at a middle part instead of the uppermost end of the slide bar in a forward slow movement screen 382, and is located at the uppermost end of the slide bar in a forward rapid movement control screen 383. Thereafter, if the hand of the user is separated from the soft button, the soft button returns to the lowermost end of the slide bar that is an initial location.

Figure 13:
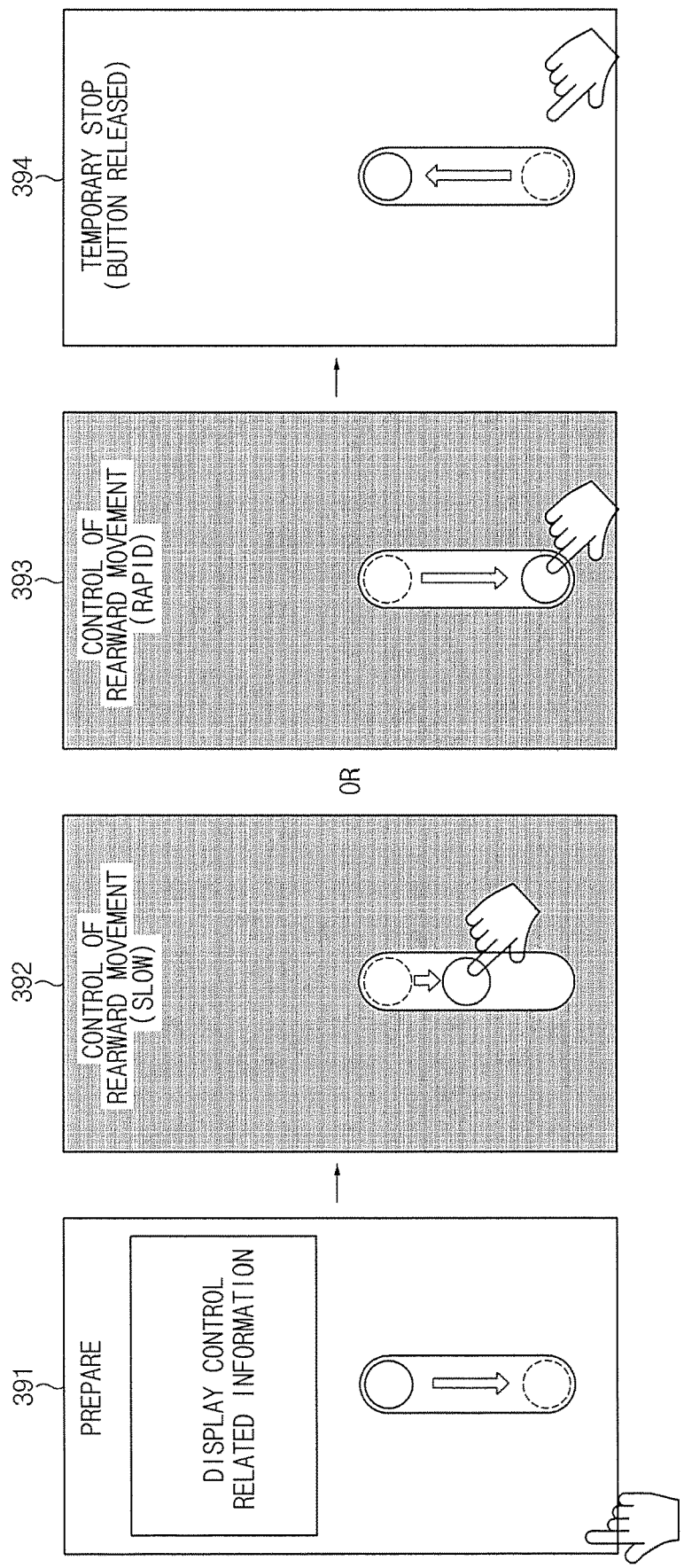
FIG. 13 is an exemplary view of a vehicle speed control screen in a remote rearward movement mode according to an embodiment of the present disclosure.

FIG. 13 is an exemplary view of a vehicle speed control screen in a remote rearward movement mode according to an embodiment of the present disclosure. Referring to FIG. 13, it can be seen that a soft button is located at the uppermost end of a slide bar in a preparation screen 391, is located at a middle part of the slide bar in a rearward flow movement control screen 392, and is located at the lowermost end of the slide bar in a rearward rapid movement control screen 393. Thereafter, if the hand of the user is separated from the soft button, the soft button returns to the uppermost end of the slide bar that is an original initial location.

Figure 14:
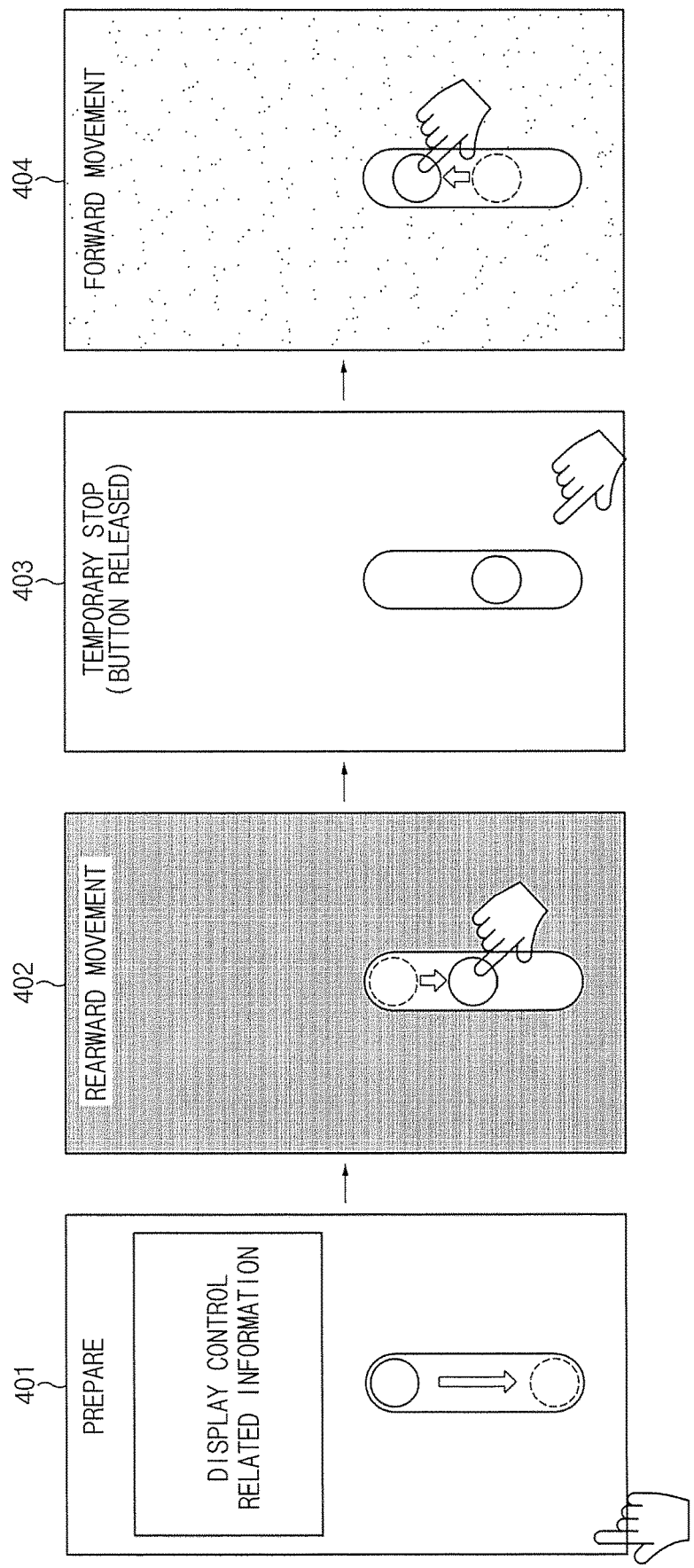
FIG. 14 is an exemplary view of switching of a function of a unidirectional soft button according to an embodiment of the present disclosure.

FIG. 14 is an exemplary view of switching of a function of a unidirectional soft button according to an embodiment of the present disclosure. Referring to FIG. 14, after a soft button is located at the uppermost end (initial location) of a slide bar in a preparation screen 401, the soft button is moved downwards and is located at a middle part of the slide bar in a rearward movement control screen 402, the location of the soft button is maintained at a time point at which the hand of the user is separated from the soft button in a temporary stop screen 403, and the hand of the user is moved while contacting the soft button for control again, the vehicle is controlled according to a movement direction in which the hand of the user is moved not from the initial location but from a location at a time point at which the hand is stopped upwards. That is, when the soft button does not return to the initial location, stays at a location from which the finger is spaced apart, and is moved again even though the finger of the user is separated from the soft button, a displacement from a location from which the finger is spaced apart to a location to which the soft button is moved.

Figure 15:
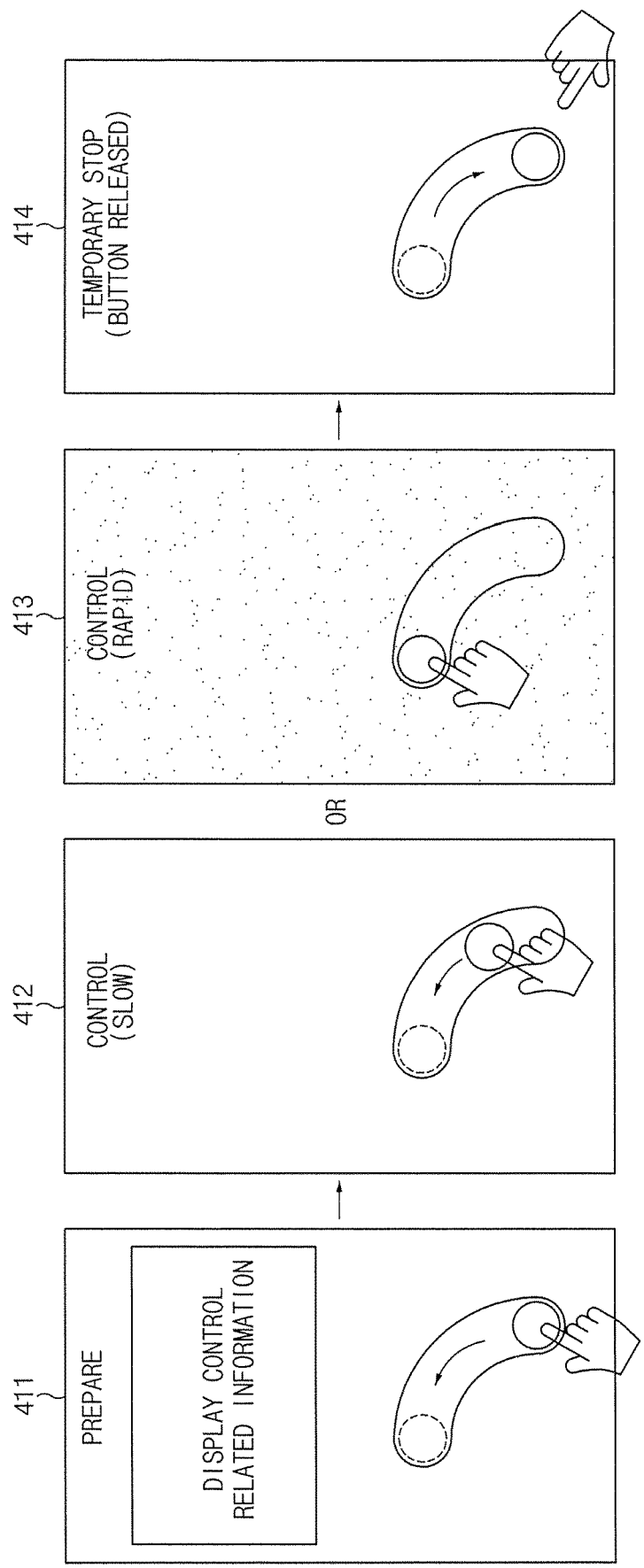
FIG. 15 is an exemplary view of a modification of a slide bar form in a remote control mode screen according to an embodiment of the present disclosure.

FIG. 15 is an exemplary view of a modification of a slide bar form in a remote control mode screen according to an embodiment of the present disclosure. Referring to FIG. 15, it can be seen that a soft button is located at a lower end of a curved slide bar in a preparation screen 411, the soft button is slightly raised in a slow movement control screen 412, and the soft button is raised to the uppermost end of a slide bar in a rapid movement control screen 413. Thereafter, if the finger of the user is separated from the soft button, the soft button returns to an initial location.

Figure 16:
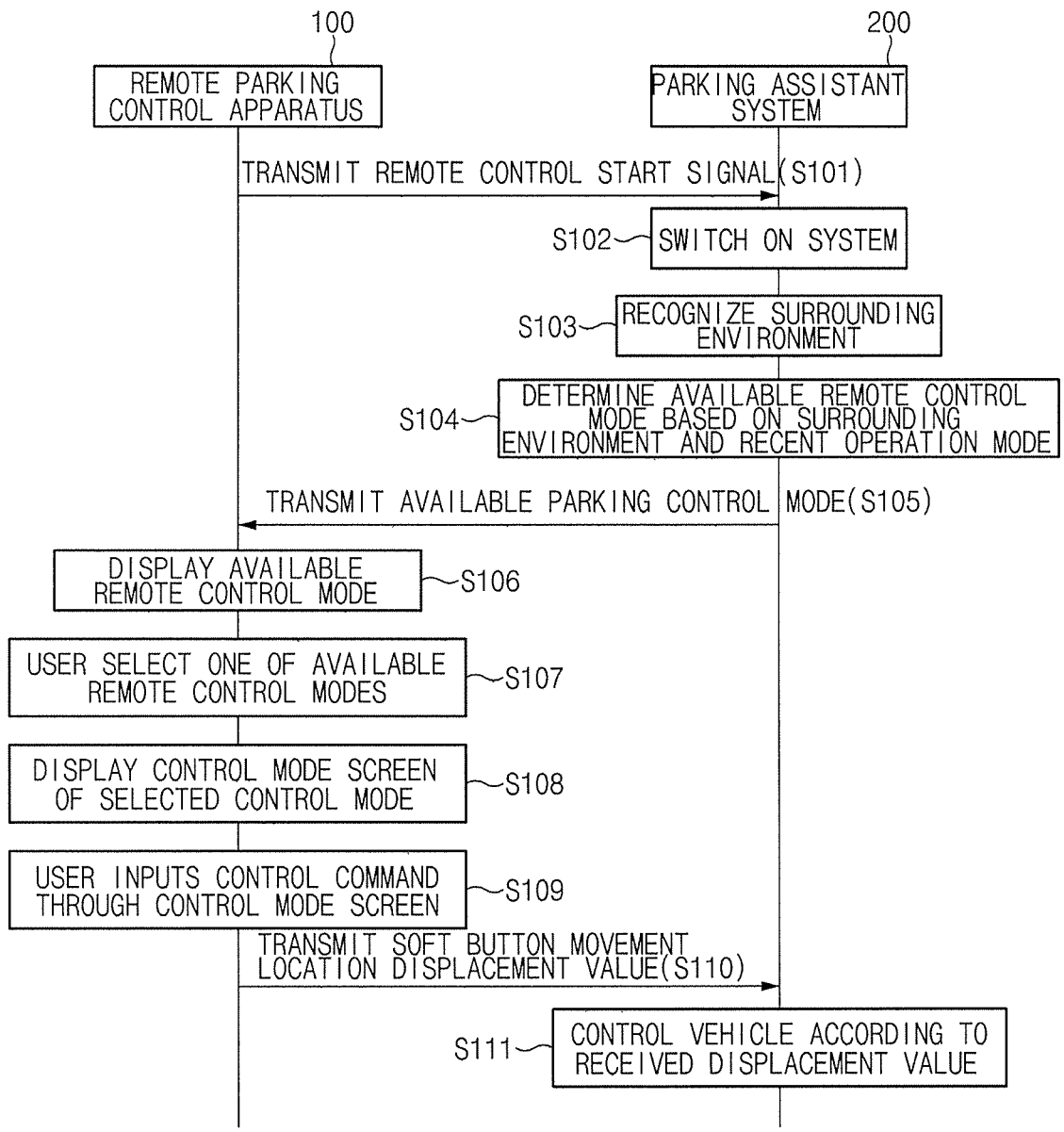
FIG. 16 is a flowchart illustrating a remote parking control method according to an embodiment of the present disclosure.

Hereinafter, a remote paring control method according to an embodiment of the present disclosure will be described in detail with reference to FIG. 16. FIG. 16 is a flowchart illustrating a remote parking control method according to an embodiment of the present disclosure.

A remote parking control apparatus 100 transmits a remote control start signal to a parking assistant system 200 (S101). Accordingly, the parking assistant system 200 switches on the system (S102) and recognizes a surrounding environment by using a sensor or the like (S103), and determines an available remote control mode based on surrounding environment information and a recent operation mode (S104). Accordingly, the available remote control mode is transmitted to the remote parking control apparatus 100 (S105).

Subsequently, the remote parking control apparatus 100 displays the available remote control mode (S106). If the user selects one (a movement direction or a movement speed) of the available remote control modes (S107), a control mode screen of the selected control mode is constituted and displayed (S108). Subsequently, the remote parking control apparatus 100 receives a control command from the user through a control mode screen (S109). Then, the input of the control command means manipulation of the soft button, and may include a movement direction (forward or rearward) of the vehicle, a speed of the vehicle, and the like.

Subsequently, the remote parking control apparatus 100 calculates a displacement value of the soft button and transmits the calculated displacement value to the parking assistant system 200 (S110).

Accordingly, the parking assistant system 200 recognizes a vehicle command according to the received displacement value and controls the vehicle (S111).

Figure 17:
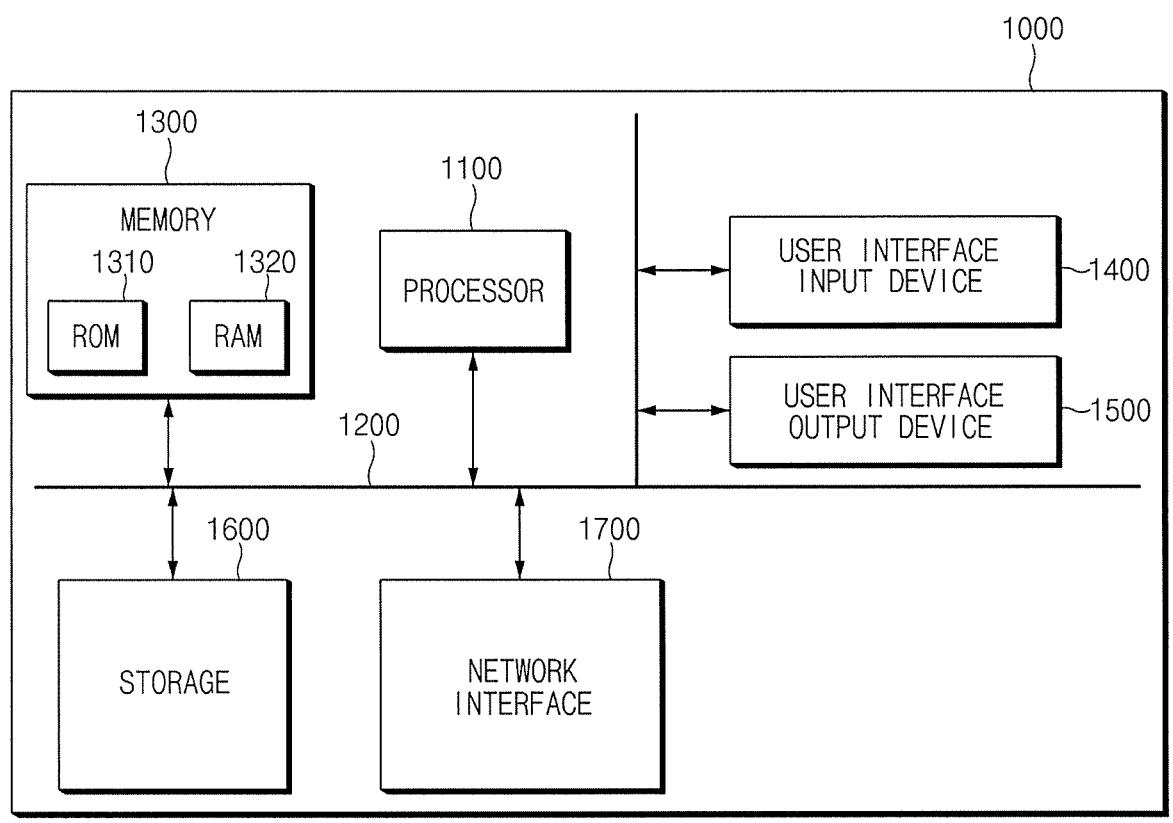
FIG. 17 is a diagram of a computer system to which the remote parking control method according to an embodiment of the present disclosure is applied.

FIG. 17 is a diagram of a computer system to which the remote parking control method according to an embodiment of the present disclosure is applied. Referring to FIG. 17, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The present technology automatically determines a surrounding situation of a vehicle, provides the user with a remote control mode screen that is suitable for a situation, and easily and conveniently controls a movement speed of the vehicle during remote control, thereby improving convenience of the user.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A remote parking control apparatus comprising:
   a communication device configured to perform wireless communication with a parking assistant system of a vehicle;
   a controller communicatively connected to the communication device and configured to constitute a remote control mode selection screen having one or more available remote control modes, and if one remote control mode of the one or more available remote control modes is selected, constitute a control mode screen corresponding to the selected remote control mode; and
   a display communicatively connected to the controller and configured to display the remote control mode selection screen having the one or more available remote control modes and the control mode screen,
   wherein the controller includes a soft button in the control mode screen, the soft button being controlled by moving a location thereof, and
   wherein the controller calculates a displacement value of a movement of the soft button if the soft button is moved by a body portion of a user.

2. The remote parking control apparatus of claim 1, wherein the communication device transmits the displacement value to the parking assistant system.

3. The remote parking control apparatus of claim 1, wherein when the soft button is touched and moved by the body portion of the user and the body portion of the user is then separated from the soft button, the controller allows the soft button to return to an original location of the soft button and determines that a control of the vehicle is stopped.

4. The remote parking control apparatus of claim 1, wherein when the soft button is touched and moved by the body portion of the user and the body portion of the user is then separated from the soft button, the controller allows the soft button to stay at a current location of the soft button and determines that a control of the vehicle is stopped.

5. The remote parking control apparatus of claim 4, wherein when the soft button is moved by the body portion of the user from a location at which the soft button is stopped, the controller calculates a displacement value from the location at which the soft button is stopped to a location to which the soft button is moved.

6. The remote parking control apparatus of claim 1, wherein the display differently displays a color of a background screen of the control mode screen according to a vehicle control speed.

7. The remote parking control apparatus of claim 1, further comprising:
a voice output device configured to output a notification sound when the soft button is moved; and
a vibration output device configured to output vibration when the soft button is moved.

8. The remote parking control apparatus of claim 7, wherein the voice output device more rapidly outputs a cycle of the notification sound or outputs a voice guide as a vehicle control speed becomes higher.

9. The remote parking control apparatus of claim 7, wherein the vibration output device increases a frequency of the vibration or increases an intensity of the vibration as a vehicle control speed becomes higher.

10. The remote parking control apparatus of claim 1, wherein the controller constitutes the control mode screen including at least one of a control progress degree until completion of a control of the vehicle, a vehicle control speed, a vehicle control direction, and vehicle surrounding image data.

11. The remote parking control apparatus of claim 1, wherein the controller constitutes the control mode screen including vehicle surrounding image data mirrored from the parking assistant system.

12. The remote parking control apparatus of claim 1, wherein the controller constitutes the soft button in at least one form of a vertical slide bar, a transverse slide bar, and a curved slide bar.

13. A remote parking control system comprising:
a parking assistant control apparatus configured to determine an available remote control mode based on a surrounding environment of a vehicle or a recently used control mode when receiving a remote control start signal; and
a remote parking control apparatus configured to receive the available remote control mode from the parking assistant control apparatus to display a control mode screen including a soft button, and to transmit a displacement value according to movement of the soft button to the parking assistant control apparatus,
wherein the parking assistant control apparatus controls a movement direction and a speed of the vehicle by using the displacement value.

14. The remote parking control system of claim 13, wherein the parking assistant control apparatus controls the vehicle in a forward direction when the soft button is moved in a first direction, controls the vehicle in a rearward direction when the soft button is moved in a second direction, and varies the speed of the vehicle according to a movement degree of the soft button.

15. The remote parking control system of claim 13, wherein the parking assistant control apparatus determines the available remote control mode according to presence of left, right, front, and rear obstacles by detecting a periphery of the vehicle, or determines an available remote control mode that is controlled to be opposite to the recently used control mode.

16. The remote parking control system of claim 13, wherein the remote parking control apparatus includes:
a communication device configured to perform wireless communication with the parking assistant control apparatus of the vehicle;
a controller communicatively connected to the communication device and configured to constitute a remote control mode selection screen having one or more available remote control modes, and if one remote control mode of the one or more available remote control modes is selected, constitute a control mode screen corresponding to the selected remote control mode; and
a display communicatively connected to the controller and configured to display the remote control mode selection screen having the one or more available remote control modes and the control mode screen.

17. A remote parking control method comprising:
constituting, by a controller, a remote control mode selection screen having one or more available remote control modes;
displaying, by the controller through a display, a control mode screen including a soft button, which is controlled by moving a location thereof, when one of the one or more available remote control modes is selected; and
transmitting, by a communication device communicatively connected to the controller, a displacement value of the soft button according to movement of the soft button to a parking assistant system of a vehicle.

18. The remote parking control method of claim 17, further comprising: remotely controlling the vehicle according to the displacement value.

* * * * *